No. 873,208. PATENTED DEC. 10, 1907.
C. H. BRYAN.
CHAIN ROPE OR BELT.
APPLICATION FILED MAY 9, 1907.
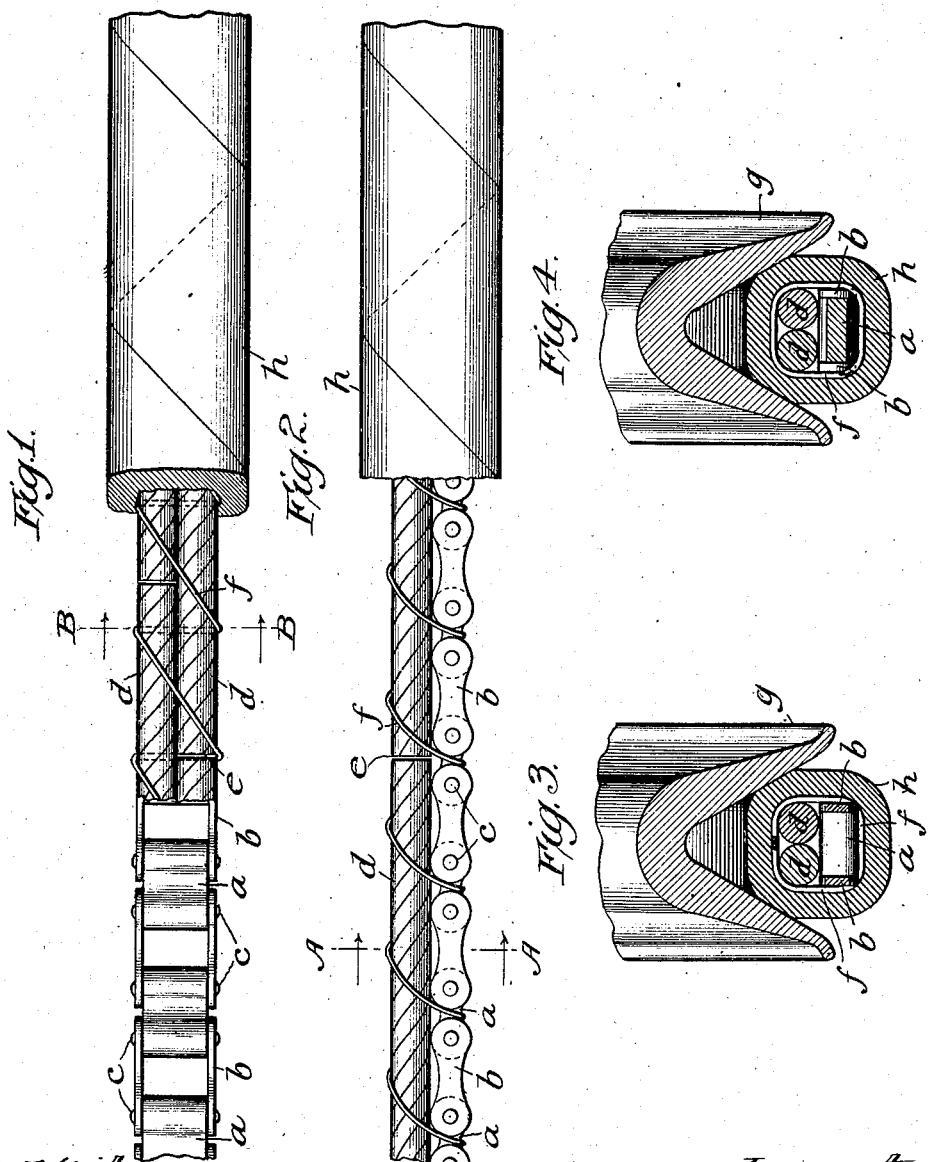

UNITED STATES PATENT OFFICE.

CLARENCE H. BRYAN, OF CHICAGO, ILLINOIS.

CHAIN ROPE OR BELT.

No. 873,208.  Specification of Letters Patent.  Patented Dec. 10, 1907.

Application filed May 9, 1907. Serial No. 372,771.

*To all whom it may concern:*

Be it known that I, CLARENCE H. BRYAN, a citizen of the United States, and resident of Chicago, in the county of Cook and State of Illinois, have invented certain new and useful Improvements in Chain Ropes or Belts, of which the following is a full, clear, and exact specification.

My invention is concerned with a novel chain-rope, which I have devised to coöperate with sheaves for power-transmission purposes generally, and more especially for use in automobiles having friction rope transmission, where power is applied through the rope from a small driving sheave to a large driving sheave. For such use, it is essential to have a rope with the strength of a chain, the elasticity of the rope for its sheave-engaging surface, one that shall be flexible in one plane only, and that shall not be affected by moisture. To this end, I have devised the novel chain-rope, to illustrate which I annex hereto a sheet of drawings, in which the same reference characters are used to designate identical parts in all the figures, of which,—

Figure 1 is a plan view of the rope seen from the sheave-engaging side, and with parts broken away to illustrate the construction thereof; Fig. 2 is a similar view of the rope, seen in side elevation; Fig. 3 is a sectional view on the line A—A of Fig. 2 showing the rope on a sheave; and Fig. 4 is a similar sectional view on the line B—B of Fig. 1.

The basis of my improved rope is a chain, which is preferably a block chain, and may be a sprocket chain. It is made up of blocks *a* and connecting links *b*, which are secured by pivots *c* in the customary manner, and, as is well known, forms a chain which is extremely strong and flexible in the plane of the sheaves with which it coöperates, but one that is incapable of lateral flexure, a feature of value in a driving rope, as it tends to prevent the rope being displaced laterally, and consequently getting out of the groove of the sheaves, when the tension is released.

To form a suitable cushioning layer on the side of the chain which engages the sprocket, I preferably employ a pair of ropes *d*, which should be cut into sections not to exceed twelve inches in length, as indicated at *e*, so that as the rope shrinks when it becomes wet, it will not leave any considerable gap at one point, as would be the case if the rope was continuous throughout its length except at one point. These sections must be secured to the chain in some suitable manner so as not to interfere with its flexibility, and for this purpose I preferably employ the wire *f*, which is wound helically about the ropes and chain, and which conveniently fits between the ends of the side links *b* in the reduced portions of the blocks *a*. With the elastic cushioning surface thus produced, it will be seen that the side of the rope engaging the sheave, which is preferably V-shaped on its interior, as seen in the section *g*, can be compressed into the groove so as to engage it very firmly and produce the desired tractive effect. A suitable exterior covering *h* is employed, and for this purpose I prefer to employ a covering made of a single strip of belting wound helically about the chain and ropes, so as to enable it to yield, compressing on the concave side and opening on the convex side, as is necessary in passing around small sheaves.

I am aware of the structure of the patent to Becker, No. 782479, dated Feb. 14, 1905, and do not claim the same as my invention.

While I have shown and described my invention as embodied in the form which I at present consider best adapted to carry out its purposes, it will be understood that it is capable of modification, and that I do not desire to be limited in the interpretation of the following claims except as may be necessitated by the state of the prior art.

What I claim as new, and desire to secure by Letters Patent of the United States, is:

1. A chain rope, consisting of a chain flexible in a single plane, a cushioning layer of longitudinally-arranged material on one of the sides in the plane of flexure, means for securing the cushioning layer on the chain, and a cover surrounding the chain and cushioning layer.

2. A chain rope, consisting of a chain flexible in a single plane, a cushioning layer of longitudinally-arranged material on one of the sides in the plane of flexure, means for securing the cushioning layer on the chain, and a helically-wound covering surrounding the chain and cushioning layer.

3. A chain-rope, consisting of a chain flexible in one plane only, a cushioning layer on the sheave side, a wire wound helically about the chain and cushioning layer to secure the latter to the chain, and a covering surrounding the chain and cushioning layer.

4. A chain-rope, consisting of a chain flexible in one plane only, a cushioning layer made in longitudinal sections on the sheave side, means for securing the cushioning layer on the chain, and a covering surrounding the chain and cushioning layer.

5. A chain-rope, consisting of a chain flexible in one plane only, a cushioning layer on the sheave side consisting of a pair of rope sections, means for securing the cushioning layer on the chain, and a covering surrounding the chain and cushioning layer.

6. A chain-rope, consisting of a chain flexible in one plane only, a cushioning layer on the sheave side consisting of a pair of rope sections, a wire wound helically about the chain and rope sections to secure the latter to the chain, and a covering surrounding the chain and cushioning layer.

7. A chain-rope, consisting of a chain flexible in one plane only, a cushioning layer on the sheave side consisting of a pair of sections, a wire wound helically about the chain and rope sections to secure the latter to the chain, and a helically-wound covering surrounding the chain and cushioning layer.

In witness whereof, I have hereunto set my hand and affixed my seal, this 6th day of May, A. D. 1907.

CLARENCE H. BRYAN. [L. S.]

Witnesses:
JOHN H. McELROY,
E. K. MACGOWAN.